United States Patent [19]
Gao et al.

[11] Patent Number: 6,015,639
[45] Date of Patent: Jan. 18, 2000

[54] THERMALLY STABLE, HIGHLY CONDUCTIVE SALT

[75] Inventors: Feng Gao; Jeremy Barker; Peikang Liu, all of Henderson, Nev.

[73] Assignee: Valence Technology, Inc., Henderson, Nev.

[21] Appl. No.: 09/016,608

[22] Filed: Jan. 30, 1998

[51] Int. Cl.[7] .................................................. H01M 6/18
[52] U.S. Cl. ........................................ 429/307; 252/62.2
[58] Field of Search ............................ 429/307; 252/62.2

[56] References Cited

U.S. PATENT DOCUMENTS 5,411,820  5/1995  Chaloner-Gill .
5,418,091  5/1995  Gozdz et al. .

OTHER PUBLICATIONS

Benrabah, D., J.–Y. Sanchez, D. Deroo and M. Armand; "Synthesis and Electrochemical Characterization of New Bulky Lithium Salts"; Solid State Ionics 70/71, 157–162 (1994). No month available.

Benrabah, D., J.–Y. Sanchez and M. Armand; "Synthesis and Electrochemical Characterization of a New Family of Lithium Salts"; Solid State Ionics 60, 87–92 (1993). N/A month.

Holcomb, Nelson R., Paul G. Nixon, and Gary L. Gard; Richard L. Nafshun and Michael M. Lerner; "Synthesis of $LiCH(SO_2CF_3)_2$ and Ionic Conductivity of Polyether–Salt Complexes"; Electrochem. Soc., vol. 143, No. 4, 1297–1300 (Apr. 1996).

Koshar, R.J. and R.A. Mitsch, "Bis(perfluoroalkylsulfonyl)methanes and Related Disulfones"; Journal Organic Chemistry, vol. 38, No. 19 (1973). N/A month.

Benrabah, D., J. –Y Sanchez, D. Deroo and M. Armand; "Synthesis and Electrochemical Chrarcterization of New Bulky Lithium Salts"; Solid State Ionics 70/71, 157–162 (1994).

*Primary Examiner*—Maria Nuzzolillo
*Assistant Examiner*—Monique M. Wills
*Attorney, Agent, or Firm*—Young & Basile, P.C.

[57] ABSTRACT

The invention provides a new family of compounds and a method of making the compounds. The new compounds are useful as ion conductive salts, and particularly useful as salts for batteries. The compounds of the invention are prepared from three principal reagents, bis (trifluoromethanesufonyl) methane $(CF_3SO_2)_2CH_2$; benzoyl chloride; and pyridine which facilitates reaction and then is removed. A precursor sodium salt $(CF_3SO_2)_2CHNa$ is first prepared. Then, equimolar amounts of the precursor sodium salt and pyridine are dissolved in anhydrous acetonitrile. A stoichiometric amount of the selected substitute benzoyl chloride is then added drop by drop. After addition of $Li_3PO_4$, there is pyridine release and formation of the product of the aforesaid two reagents. In the benzene ring, $R_1$, $R_2$, $R_3$, $R_4$, and $R_5$ are each identical or different and are each independently selected from hydrogen and an electron withdrawing substituent.

18 Claims, 4 Drawing Sheets

FORMULA A

THERMALLY STABLE, HIGHLY CONDUCTIVE SALT

FIELD OF THE INVENTION

This invention relates to electrolytes which function as a source of alkali metal ions for providing ionic mobility and conductivity. The invention more particularly relates to electrolytic cells where such electrolytes function as an ionically conductive path between electrodes.

BACKGROUND OF THE INVENTION

Electrolytes are an essential member of an electrolytic cell or battery. In one arrangement, a battery or cell comprises an intermediate separator element containing an electrolyte solution through which lithium ions from a source electrode material move between cell electrodes during the charge/discharge cycles of the cell. The invention is particularly useful for making such cells in which the ion source electrode is a lithium compound or other material capable of intercalating lithium ions, and where an electrode separator membrane comprises a polymeric matrix made ionically conductive by the incorporation of an organic solution of a dissociable lithium salt which provides ionic mobility.

Early Lithium Metal Cells

Early rechargeable lithium cells utilized lithium metal electrodes as the ion source in conjunction with positive electrodes comprising compounds capable of intercalating the lithium ions within their structure during discharge of the cell. Such cells relied, for the most part, on separator structures or membranes which physically contained a measure of fluid electrolyte, usually in the form of a solution of a lithium compound, and which also provided a means for preventing destructive contact between the electrodes of the cell. Sheets or membranes ranging from glass fiber filter paper or cloth to microporous polyolefin film or nonwoven organic or inorganic fabric have been saturated with solutions of an inorganic lithium compound, such as $LiClO_4$, $LiPF_6$, or $LiBF_4$, in an organic solvent, e.g., propylene carbonate, diethoxyethane, or dimethyl carbonate, to form such electrolyte/separator elements. The fluid electrolyte bridge thus established between the electrodes has effectively provided the necessary Li+ ion mobility at conductivities in the range of about $10^{-3}$ S/cm.

Ion, Rocking Chair Cells and Polymer Cells

Although serving well in this role of ion conductor, these separator elements unfortunately comprise sufficiently large solution-containing voids that continuous avenues may be established between the electrodes, thereby enabling lithium dendrite formation during charging cycles which eventually leads to internal cell short-circuiting. Some success has been achieved in combatting this problem through the use of lithium-ion cells in which both electrodes comprise intercalation materials, such as lithiated manganese oxide and carbon (U.S. Pat. No. 5,196,279), thereby eliminating the lithium metal which promotes the deleterious dendrite growth. Although providing efficient power sources, these lithium-ion cells do not readily attain the capacity provided by lithium metal electrodes.

Another approach to controlling the dendrite problem has been the use of continuous films or bodies of polymeric materials which provide little or no continuous free path of low viscosity fluid in which the lithium dendrite may propagate. These materials may comprise polymers, e.g., poly(alkene oxide), which are enhanced in ionic conductivity by the incorporation of a salt, typically a lithium salt such as $LiClO_4$, $LiPF_6$, or the like. A range of practical ionic conductivity, i.e., over about $10^{-5}$ to $10^{-3}$ S/cm, was only attainable with these polymer compositions at ambient conditions well above room temperature, however. Some improvement in the conductivity of the more popular poly (ethylene oxide) compositions has been reported to have been achieved by radiation-induced cross-linking (U.S. Pat. No. 5,009,970) or by meticulous blending with exotic ion-solvating polymer compositions (U.S. Pat. No. 5,041,346). Each of these attempts achieved limited success due to attendant expense and restricted implementation in commercial practice.

"Solid" and "Liquid" Batteries of the Prior Art

More specifically, electrolytic cells containing an anode, a cathode, and a solid, solvent-containing electrolyte incorporating an inorganic ion salt were referred to as "solid batteries". (U.S. Pat. No. 5,411,820). These cells offer a number of advantages over electrolytic cells containing a liquid electrolyte (i.e., "liquid batteries") including improved safety factors. Despite their advantages, the manufacture of these solid batteries requires careful process control to minimize the formation of impurities due to decomposition of the inorganic ion salt when forming the solid electrolyte. Excessive levels of impurities inhibit battery performance and can significantly reduce charge and discharge capacity.

Specifically, solid batteries employ a solid electrolyte interposed between a cathode and an anode. The solid electrolyte contains either an inorganic or an organic matrix and a suitable inorganic ion salt as a separate component. The inorganic matrix may be non-polymeric [e.g., β-alumina, silver oxide, lithium iodide, etc.] or polymeric [e.g., inorganic (polyphosphazene) polymers] whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic monomers include, by way of example, polyethylene oxide, polypropylene oxide, polyethyleneimine, polyepichlorohydrin, polyethylene succinate, and an acryloyl-derivatized polyalkylene oxide containing an acryloyl group.

Because of their expense and difficulty in forming into a variety of shapes, inorganic non-polymeric matrices are generally not preferred and the art typically employs a solid electrolyte containing a polymeric matrix. Nevertheless, electrolytic cells containing a solid electrolyte containing a polymeric matrix suffer from low ion conductivity and, accordingly, in order to maximize the conductivity of these materials, the matrix is generally constructed into a very thin film, i.e., on the order of about 25 to about 250 μm. As is apparent, the reduced thickness of the film reduces the total amount of internal resistance within the electrolyte thereby minimizing losses in conductivity due to internal resistance.

The solid electrolytes also contain a solvent (plasticizer), added to the matrix primarily in order to enhance the solubility of the inorganic ion salt in the solid electrolyte and thereby increase the conductivity of the electrolytic cell. In this regard, the solvent requirements of the solvent used in the solid electrolyte have been art recognized to be different from the solvent requirements in liquid electrolytes. For example, solid electrolytes require a lower solvent volatility as compared to the solvent volatilities permitted in liquid electrolytes.

Suitable solvents well known in the art for use in such solid electrolytes include, by way of example, propylene carbonate, ethylene carbonate, γ-butyrolactone, tetrahydrofuran, glyme (dimethoxyethane), diglyme, tetraglyme, dimethylsulfoxide, dioxolane, sulfolane and the like. These are examples of aprotic, polar solvents.

Heretofore, the solid, solvent-containing electrolyte has typically been formed by one of two methods. In one method, the solid matrix is first formed and then a requisite amount of this material is dissolved in a volatile solvent. Requisite amounts of the inorganic ion salt and the electrolyte solvent (usually a glyme and the organic carbonate) are then added to the solution. This solution is then placed on the surface of a suitable substrate (e.g., the surface of a cathode) and the volatile solvent is removed to provide for the solid electrolyte. In another method, a monomer or partial polymer of the polymeric matrix to be formed is combined with appropriate amounts of the inorganic ion salt and the solvent. This mixture is then placed on the surface of a suitable substrate (e.g., the surface of the cathode) and the monomer is polymerized or cured (or the partial polymer is then further polymerized or cured) by conventional techniques (heat, ultraviolet radiation, electron beams, etc.) so as to form the solid, solvent-containing electrolyte. When the solid electrolyte is formed on a cathodic surface, an anodic material can then be laminated onto the solid electrolyte to form a solid battery (i.e., an electrolytic cell).

A highly favored electrolyte/separator film is prepared from a copolymer of vinylidene fluoride and hexafluoropropylene. Methods for making such films for cell electrodes and electrolyte/separator layers are described in U.S. Pat. Nos. 5,418,091; 5,460,904; and 5,456,000 assigned to Bell Communications Research, each of which is incorporated herein by reference in its entirety. A flexible polymeric film useful as an interelectrode separator or electrolyte member in electrolytic devices, such as rechargeable batteries, comprises a copolymer of vinylidene fluoride with 8 to 25% hexafluoropropylene. The film may be cast or formed as a self-supporting layer retaining about 20% to 70% of a high-boiling solvent or solvent mixture comprising such solvents as ethylene carbonate, propylene carbonate, dimethyl carbonate, and dibutyl phthalate. The film may be used in such form or after leaching of the retained solvent with a film-inert low-boiling solvent to provide a separator member into which a solution of electrolytic salt is subsequently imbibed to displace retained solvent or replace solvent previously leached from the polymeric matrix.

Electrolyte Breakdown

Regardless of which technique is used in preparing an electrolyte/separator, a recurring problem has been the presence of impurities which interfere with cell function and can reduce battery life. The source of these impurities is the partial decomposition of the inorganic ion salt formed in the polymer matrix. Partial decomposition occurs due to exposure of the inorganic ion salts to the high temperatures used, for example, in forming the polymer matrix, and/or in evaporating the volatile solvent, and/or in batteries used at elevated temperatures. These high temperatures cause the salt to break down into insoluble or less soluble salts. For example, upon decomposition of lithium hexafluorophosphate ($LiPF_6$), the decomposition product LiF is formed; and the LiF is much less soluble in the electrolyte solvent and can precipitate out. Such insoluble or less soluble salts cannot function to transfer electrons, and hence the resulting battery is rendered less efficient.

Thus, in preparing electrolyte/separator, great care must be taken to maintain processing temperatures below the threshold level for significant salt decomposition. The need for careful monitoring of process temperatures increases manufacturing costs and at the same time results in a percentage of the electrolyte/separators produced being off specification due to unavoidable process temperature variation. Electrolyte/separator materials meeting production specifications generally contain small but tolerable levels of impurities which can nevertheless affect cell performance, particularly with respect to cumulative capacity. Cumulative capacity of a battery is defined as the summation of the capacity of the battery over each cycle (charge and discharge) in a specified cycle life.

Quite apart from the problem of decomposition is the cost of the inorganic ion salts. Simple salts such as lithium halides are less preferred in the electrolyte because they are either insoluble or unstable. More complex salts are favored because of their greater compatibility, but are more costly. A highly preferred, complex salt is $LiPF_6$, but this salt has been found to be very heat sensitive and quite expensive. Another preferred, complex salt is lithium hexafluoroarsenate. This salt poses significant disposal problems due to the presence of arsenic. Notwithstanding their complexity and costs, even under the best of circumstances (e.g. impurity levels approaching zero), the inorganic ion salts typically have a transference number between 0.4 and 0.55, meaning that the ion salt carries only between 40% and 55% of the total plus (+) charge.

In view of the above, it can be seen that it is desirable to have a novel salt which is economical, stable, does not degrade capacity; and which is usable in a variety of electrolyte/separator configurations, as described above as exemplary.

SUMMARY OF THE INVENTION

The invention provides a new family of compounds and a method of making the compounds. The new family of compounds is represented by Formulas A and B of FIGS. 1 and 2 having the following chemical formulae

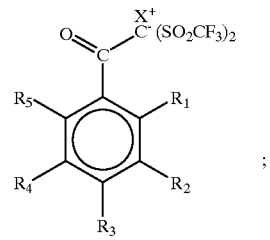

Formula A

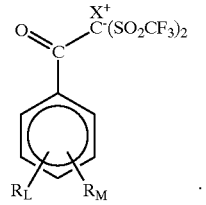

Formula B

. The new compounds are useful as ion conductive salts, and particularly useful as salts for batteries. Herein the terms compound and salt refer to the structural Formulas A and B. The new salts are as represented by the Formula A of FIG. 1. In Formula A, $R_1$, $R_2$, $R_3$, $R_4$, and $R_5$ are each identical or different and are each independently selected from hydrogen and an electron withdrawing substituent. Preferably, at least one of $R_1$, $R_2$, $R_3$, $R_4$, and $R_5$ is selected from the electron withdrawing substituent. In Formula A, the X is an alkali metal. Desirably, X is lithium (Li), sodium (Na) or potassium (K). Preferably, the X is lithium. Exemplary electron withdrawing groups (substituents) useable in the compound are listed here in order of decreasing withdrawing effect: —$N^+(CH_3)_4$, —$N^+R_4$, —$NO_2$, —$CF_3$, —$SO_3H$, —CN, —COCl, —COOR, —COOH, —COR, —CHO—, —$CHY_2$, —$CH_2Y$, —Y etc. Here, Y designates one or more are halogen atoms: F, Cl, Br and I and R denotes H.

In Formula B, $R_L$ and $R_m$ are each identical or different, $R_L$ is an electron withdrawing substituent, $R_m$ is hydrogen or an electron withdrawing substituent, and X is an alkali metal.

Electron withdrawing group draws electron(s) partially from its adjacent atoms through net effect of both conjugation and induced effects so that the electron density on these atoms are decreased. The electron withdrawing effects can be seen many atoms away from the withdrawing group. In the present case, the electron density on the carbon anion is pulled away by the electron withdrawing group(s) on the benzene ring. The invention is not limited to the earlier listed withdrawing groups (substituents). In accordance with conventional nomenclature, $R_1$ through $R_5$ respectively occupy the 2 through 6 positions on the benzene ring.

It is desirable that any two of $R_2$, $R_3$ and $R_4$ are electron withdrawing substituents and $R_1$ and $R_5$ are each hydrogen. In one alternative, the two electron withdrawing substituents are the same; and in another alternative, the two electron withdrawing substituents are different.

It is preferred that when one electron withdrawing substituent is used, it is at the $R_2$ position and is preferably selected from —$CF_3$, —CN and $NO_2$. It is preferred that when two electron withdrawing substituents are used, they are at the $R_2$ and $R_4$ positions and are selected from the aforesaid general and preferred withdrawing groups. The $R_2$ and $R_4$ may be the same or different from one another. The X positive ion of the compound is an alkali metal, desirably sodium (Na) or lithium (Li) and preferably Li, for use in lithium cells. The cells will be described below.

These new compounds are highly suited for use as salts for electrolyte formulations due to the aforesaid characteristics of thermal stability; ion conductivity; dissociation; stability on exposure to air and water; and environmental compatibility. Electrolyte solutions comprising the new salts are characterized by good ion transport capability. The electrolyte solution is used in a cell or battery which comprises a first electrode, a counter-electrode, which forms an electrochemical couple with said first electrode, and the electrolyte for ion transport between said electrodes.

The compounds of the invention are prepared from three principal reagents, bis (trifluoromethanesufonyl) methane $(CF_3SO_2)_2CH_2$; benzoyl chloride; and pyridine which facilitates reaction and then is removed. A precursor sodium salt $(CF_3SO_2)_2CHNa$ is first prepared. Then, equimolar amounts of the precursor sodium salt and pyridine are dissolved in anhydrous acetonitrile. A stoichiometric amount of the selected substitute benzoyl chloride is then added drop by drop. The resulting NaCl is filtered and acetonitrile removed. Then, the crude pyridinium salt is dissolved in THF and reacted with lithium hydroxide for 48 hours at room temperature. The lithium hydroxide is insoluble in THF. The organic phase is filtered, the solvents evaporated and the crude salt washed with anhydrous methylene chloride to remove the impurities. A white powder is formed by this process and is heated at 70° C. under vacuum. After the addition of $Li_3PO_4$, there is the pyridine release and both the disappearance of the previous peak and a new signal corresponding to lithium salt, the expected molecular structure as per the Figures and Formulas described herein.

The invention provides substantial advantages over conventional compounds presently used as salts. The new compounds (salts) are thermally stable at the high operating temperatures of batteries. They have high ion conductivity due to the presence of a large anion and strong electron withdrawing group. They readily dissociate in solvents and are not sensitive to water present as an impurity.

These and other objects, features, and advantages will become apparent from the following description of the preferred embodiments, claims, and accompanying drawings.

DETAILED DESCRIPTION OF THE PREFERRED EMBODIMENTS

The invention provides a new family of lithium salts; each of the salts is stable against decomposition in difficult environments. The new salts are organic, which differs from conventional inorganic salts now used. Advantageously, the new salts are usable in essentially any type of electrolyte/separator arrangement, including, but not limited to, those electrolyte/separator elements described earlier in the Background. A preferred lithium ion cell structure will be described below, embodying the novel salts. The search for new electrolyte salts has led to the formation of various inorganic and organic salts, but such salts are not favored for commercial use and are only known to be used in polyethylene oxide complexes. Before further describing the novel features of the invention, it is useful to understand the structure and deficiencies of some prior organic salts. In the literature, compounds have been suggested such as $(CF_3SO_2)_2CH^-M^+$ (Solid State Ionics (SSI) 70/71, p.157, 1994; J. Electrochem Society, V.143, No. 4, April 1996); $(CF_3SO_2)N^- M^+$ (SSI 60, p. 87, 1993); complexes of polyethylene oxide with: $Li(OCH_2CH_2)_3OCH_3$; $Li(OCH_2CH_2)_3OLi$; $CH_3(OCH_2CH_2)_3O(CH_2)_3SO_3Li$; $CH_2CH_2C_6H_4(COC(CF_3SO_2)_2Li)_2$; $CH_3(OCH_2CH_2)_3O(CH_2)_4SO_3Li$; $LiO_3S(CH_2)_3(OCH_2CH_2)_3O(CH_2)_3SO_3Li$; $LiO_3S(CH_2)_4(OCH_2CH_2)_3O(CH_2)_4SO_3Li$ (SSI 60, p.87, 1993; SSI 70/71, p.157, 1994; U.S. Pat. No. 5,411,820).

While these salts have met with some success, according to the literature they are used only in combination with polyethylene oxide (PEO) to form a complex. The PEO/salt complex is used because the salt lacks stability, according to the literature. What is needed is a new salt that is stable in a variety of electrolyte solvents and which does not depend on a particular polymeric material for its stability.

Figure 1:
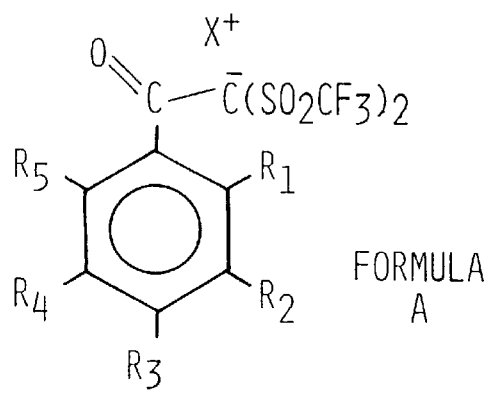
FIG. 1 is an illustration of the general formula of a salt compound of the invention.
Figure 2:
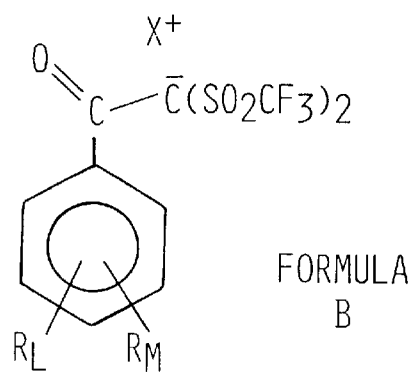
FIG. 2 is an illustration of the general formula of a preferred salt compound of the invention.

The invention provides a new family of lithium salts and a method for preparing the new salts. The new salts are represented by Formulas A and B of FIGS. 1 and 2. The new salts have many advantageous features: (1) Thermally stable above 270° C.; (2) High conductivity due to a large anion with a strong electron withdrawing group. The electron withdrawing group reduces the interaction between the $X^+$, preferably $Li^+$ and the anion so that dissociation of the salt into the electrolyte solvent(s) is easier; (3) Not sensitive to water; and (4) Expected to be environmentally safe. The new salts are represented by the Formula A of FIG. 1; where $R_1$, $R_2$, $R_3$, $R_4$, and $R_5$ are each identical or different; are each independently selected from hydrogen and an electron withdrawing substituent; provided at least one of said $R_1$, $R_2$, $R_3$, $R_4$, and $R_5$ is selected from the electron withdrawing substituent; and where X is an alkali metal. Exemplary electron withdrawing groups (substituents) useable in the compound are listed here in order of decreasing withdrawing effect: $-N^+(CH_3)_4$, $-N^+R_4$, $-NO_2$, $-CF_3$, $-SO_3H$, $-CN$, $-COCl$, $-COOR$, $-COOH$, $-COR$, $-CHO-$, $-CHY_2$, $-CH_2Y$, $-Y$ etc. (where Y designates one or more are halogen atoms: F, Cl, Br and I).

Electron withdrawing group draws electron(s) partially from its adjacent atoms through net effect of both conjugation and induced effects so that the electron density on these atoms are decreased. The electron withdrawing effects can be seen many atoms away from the withdrawing group. In the present case, the electron density on the carbon anion is pulled away by the electron withdrawing group(s) on the benzene ring. The invention is not limited to the earlier listed withdrawing groups (substituents).

It is desirable that any two of $R_2$, $R_3$ and $R_4$ are electron withdrawing substituents and $R_1$ and $R_5$ are each hydrogen. In one alternative, the two electron withdrawing substituents are the same; and in another alternative, the two electron withdrawing substituents are different.

It is preferred that when one electron withdrawing substituent is used, it is at the $R_2$ position and is preferably selected from $-CF_3$, $-CN$ and $NO_2$. It is preferred that when two electron withdrawing substituents are used, they are at the $R_2$ and $R_4$ positions and are selected from the aforesaid general and preferred withdrawing groups. The $R_2$ and $R_4$ may be the same or different from one another. The X positive ion of the compound is an alkali metal, desirably sodium (Na) or lithium (Li) and preferably Li, for use in lithium cells. The cells will be described below.

These new compounds are highly suited for use as salts for electrolyte formulations due to the aforesaid characteristics of thermal stability; ion conductivity; dissociation; stability on exposure to air and water; and environmental compatibility. Electrolyte solutions comprising the new salts are characterized by good ion transport capability. The electrolyte solution is used in a cell or battery which comprises a first electrode, a counter-electrode, which forms an electrochemical couple with said first electrode, and an electrolyte for ion transport between said electrodes.

Figure 3:
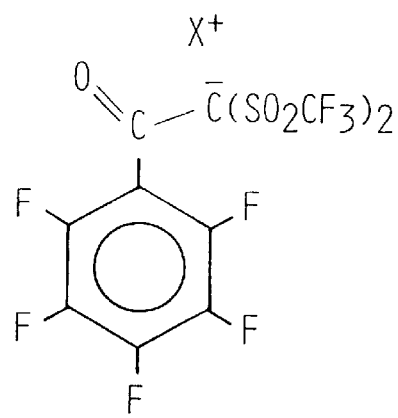
FIG. 3 is an illustration of a preferred compound formed by combining the precursor 2,3,4,5,6-pentafluorobenzoyl chloride with a salt of $(CF_3SO_2)_2CH_2$ to form said preferred compound of the invention per FIG. 3.
Figure 4:
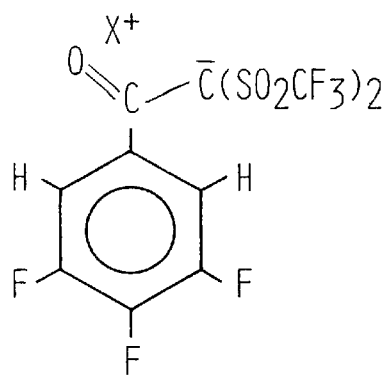
FIG. 4 is an illustration of a preferred compound formed by combining the precursor 3,4,5-trifluorobenzoyl chloride with a salt of $(CF_3SO_2)_2CH_2$ to form said preferred compound of the invention per FIG. 4.
Figure 5:
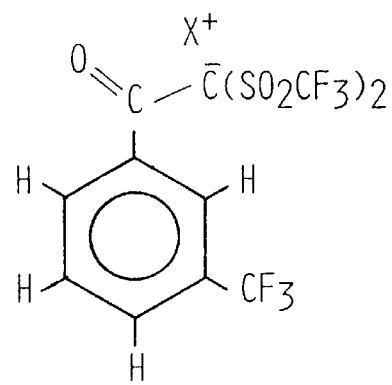
FIG. 5 is an illustration of preferred compound formed by combining the precursor 3-(trifluoromethyl)benzoyl chloride with a salt of $(CF_3SO_2)_2CH_2$ to form said preferred compound of the invention per FIG. 5.
Figure 6:
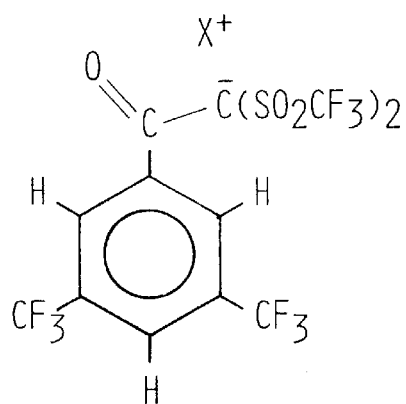
FIG. 6 is an illustration of a preferred compound formed by combining the precursor 3,5-di(trifluoromethyl) benzoyl chloride with a salt $(CF_3SO_2)_2CH_2$ to form said preferred compound of FIG. 6.

A method for making the new salts will now be described. The method of the invention will be illustrated by reference to the term "substituted benzoyl chloride", which indicates that hydrogen originally present at any one or more of the $R_1$, $R_2$, $R_3$, $R_4$ and $R_5$ positions has been replaced by any of the electron withdrawing groups. The precursor substituted benzoyl chlorides are prepared by well-known substitution reaction mechanisms, as described in organic chemistry text books, and will not be repeated here. The orientation of substituent group attachment is controllable. Also, if a mixture of ortho, para and meta positions occurs, selective separation is possible, as known by those skilled in the art, and as evidenced by basic textbook techniques. (Morrison & Boyd, Organic Chemistry, 2nd Ed (1969); Merck Index, 10th Ed, #1116 benzoyl chloride, and trifluoromethyl substitution #1114). Starting materials $R_1=R_2=R_3=R_4=R_5=F$, namely 2,3,4,5,6-pentafluorobenzoyl chloride, FIG. 3; $R_2=R_3=R_4=F$, namely 3,4,5-trifluorobenzoyl chloride, FIG. 4; $R_2=CF_3$, namely 3-(trifluoromethyl) benzoyl chloride, FIG. 5; and $R_2=R_4=CF_3$, namely 3,5-di(trifluoromethyl) benzoyl chloride, FIG. 6. The other component of the final product is from bis (trifluoromethanesufonyl) methane $(CF_3SO_2)_2CH_2$, readily convertible to $(CF_3SO_2)_2CH^-Na^+$ for reaction with any of the variety of substituted benzoyl chlorides.

Figure 7:
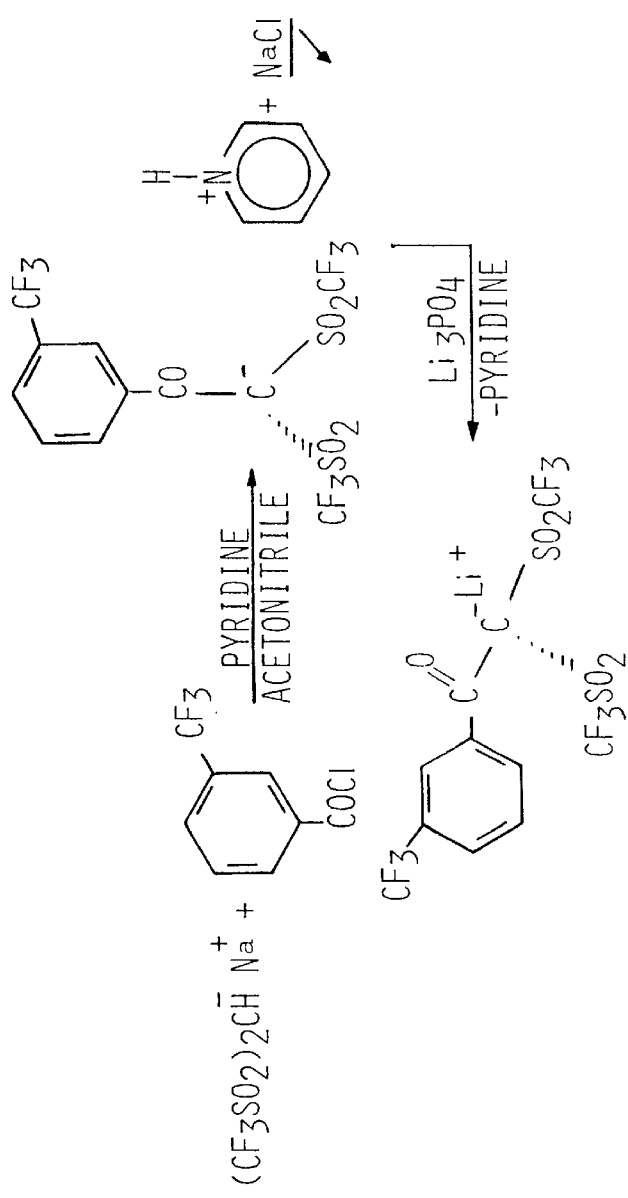
FIG. 7 is an illustration of a general reaction sequence for preparing an electrolyte salt compound according to the invention. The salt is prepared from an exemplary —$CF_3$ substituted benzoyl chloride, namely, 3-(trifluoromethyl) benzoyl chloride, and a sodium salt of $(CF_3SO_2)_2CH_2$, which is $(CF_3SO_2)_2CHNa$.

The synthesis of the bis(trifluoromethane-sulfonyl) methane $(CF_3SO_2)_2CH_2$, is based on a procedure described in Inorganic Chemistry 27 (1988) 2135; and SSI 70/71 (1994) 157–162. The typical procedure for the synthesis of the precursor sodium salt $(CF_3SO_2)_2CHNa$ consists of mixing an aqueous solution of $(CF_3SO_2)_2CH_2$ with an equimolar amount of the corresponding sodium phosphate, followed by filtration and dehydration. The white solid is then dissolved in dimethyl ketone and after the solvent has been filtered and removed, the precursor sodium salt is dried in vacuum. The precursor sodium salt is then used along with the substituted benzoyl chloride to make the compounds of the invention. Due to the high acidity of the precursor to the sodium salt precursor, (pKa of about −1), the $(CF_3SO_2)_2CH_2$ is transformed into $(CF_3SO_2)_2CHNa$. This salt is used as a nucleophile to react with the acidic benzoyl chloride. FIG. 7 shows a reaction scheme using an exemplary $-CF_3$ substituted benzoyl chloride, and the sodium salt. This reaction scheme is an alteration of a reaction proposed in SSI 60 (1993) 87–92 and SSI 70/71 (1994) 157, and is modified to achieve the results described here.

First, equimolar amounts of the precursor sodium salt and pyridine in anhydrous acetonitrile are dissolved and a stoichiometric amount of the selected substitute benzoyl chloride is then added drop by drop. The resulting NaCl is filtered and acetonitrile removed. Then, the crude pyridinium salt is dissolved in THF and reacted with lithium hydroxide for 48 h at room temperature. The lithium hydroxide is insoluble in THF. The organic phase is filtered, the solvents evaporated and the crude salt washed with anhydrous methylene chloride to remove the impurities. A white powder is formed by this process and is heated at 70° C. under vacuum.

The reaction may be followed by GC to show the complete disappearance of the substituted benzoyl chloride. GPC is usable to show the disappearance of sodium salt precursor, $(CF_3SO_2)_2CHNa$. A single well-defined peak identifies pyridinium salt. After the addition of $Li_3PO_4$, there is the pyridine release and both the disappearance of the previous peak and a new signal corresponding to lithium salt. Infra-red spectrum is usable to show agreement with the expected molecular structure; the aromatic group as per the 3030 and 1600—1500 $cm^{-1}$ bands. The infra-red spectrum is also usable to show intense bands in 1160–1140 $cm^{-1}$ region for the $SO_2$ group. $CF_3$ groups show absorption in the 1360–1300 $cm^{-1}$ region. A thermogravimetric study of unsubstituted $LiCCOC_6H_5(SO_2CF_3)_2$ shows that, at a heating rate of 10° C./min, the decomposition begins around 270° C. The substituted salts of the invention, as per FIGS. 1–6, are expected to show even higher thermal stability. This thermal stability is more than adequate for use in lithium ion polymer electrolytic cells. A conductivity study of unsubstituted $LiCCOC_6H_5(SO_2CF_3)_2$ showed good ionic conductivities. High ionic conductivities and a wide electrochemical window are key advantages expected for the substituted salts of the invention.

A battery or cell which utilizes the novel family of salts of the invention will now be described. Note that the preferred cell arrangement described here is illustrative and the invention is not limited thereby.

Polymeric electrolytic cells comprise polymeric film composition electrodes and separator membranes. In particular, rechargeable lithium battery cells comprise an intermediate separator element containing an electrolyte solution through which lithium ions from a source electrode material move between cell electrodes during the charge/discharge cycles of the cell. In such cells an ion source electrode is a lithium compound or other material capable of intercalating lithium ions. An electrode separator membrane comprises a polymeric matrix made ionically conductive by the incorporation of an organic solution of a dissociable lithium salt which provides ionic mobility. Strong, flexible polymeric electrolytic cell separator membrane materials retain electrolyte lithium salt solutions and remain functional over temperatures ranging well below room temperature. These electrolyte membranes are used either in the usual manner as separator elements with mechanically assembled battery cell components, or in composite battery cells constructed of successively coated layers of electrode and electrolyte compositions.

Figure 8:
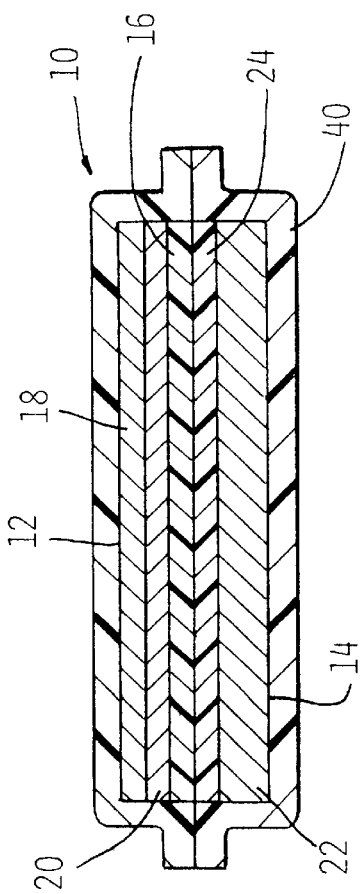
FIG. 8 is a diagrammatic representation of a typical laminated lithium-ion battery cell structure which is prepared with the electrolyte salt of the present invention.

A typical laminated battery cell structure 10 is depicted in FIG. 8. It comprises a negative electrode side 12, a positive electrode side 14, and an electrolyte/separator 16 therebetween. Negative electrode side 12 includes current collector 18, and positive electrode side 14 includes current collector 22. A copper collector foil 18, preferably in the form of an open mesh grid, upon which is laid a negative electrode membrane 20 comprising an intercalation material such as carbon or graphite or low-voltage lithium insertion compound, dispersed in a polymeric binder matrix. An electrolyte separator film 16 membrane of plasticized copolymer is positioned upon the electrode element and is covered with a positive electrode membrane 24 comprising a composition of a finely divided lithium intercalation compound in a polymeric binder matrix. An aluminum collector foil or grid 22 completes the assembly. Protective bagging material 40 covers the cell and prevents infiltration of air and moisture.

Figure 9:
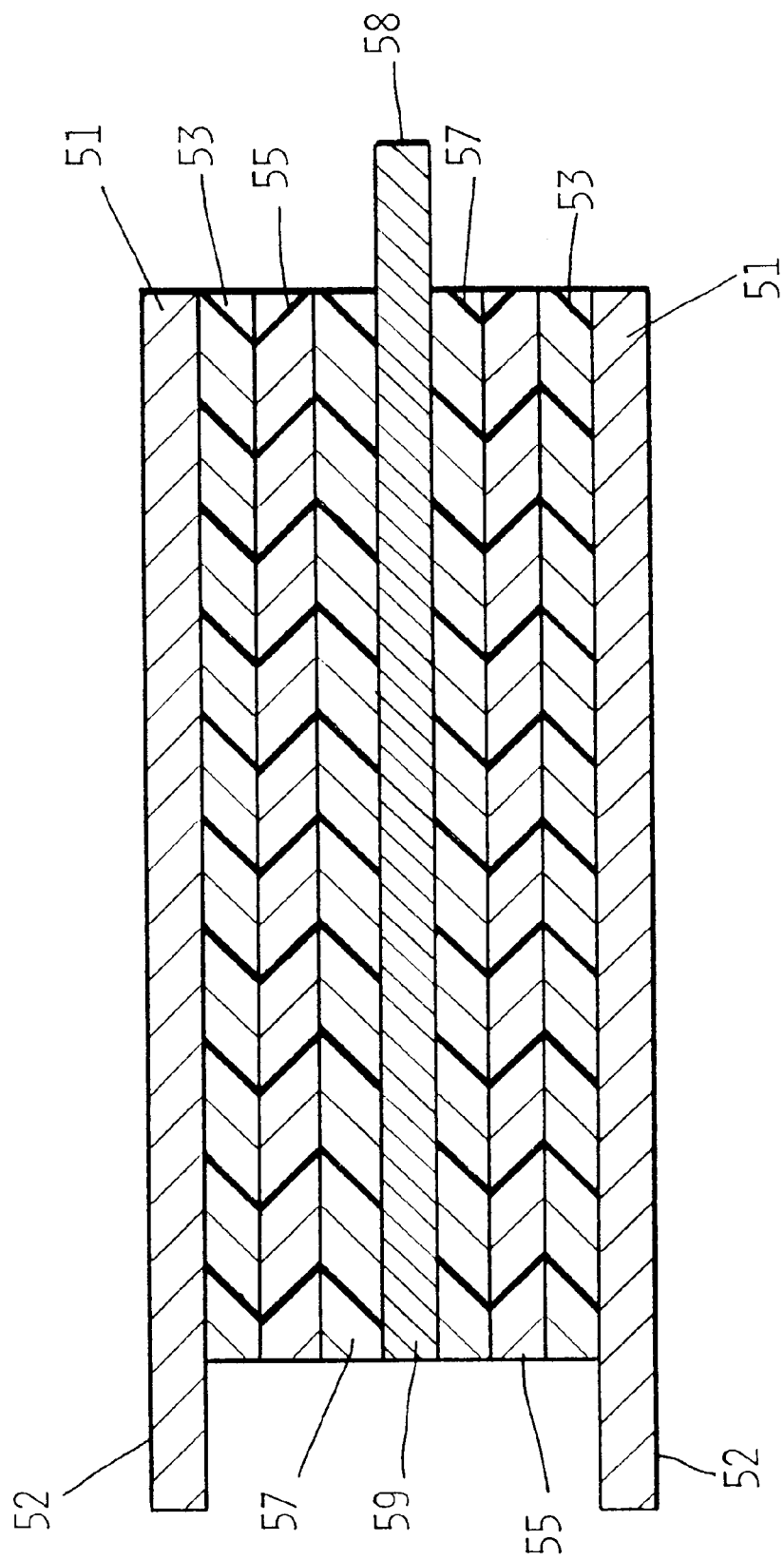
FIG. 9 is a diagrammatic representation of a multicell battery cell structure which is prepared with the electrolyte salt of the present invention.

In another embodiment, a multicell battery configuration as per FIG. 9 is prepared with copper current collector 51, negative electrode 53, electrolyte/separator 55, positive electrode 57, and aluminum current collector 59. Tabs 52 and 58 of the current collector elements form respective terminals for the battery structure.

The relative weight proportions of the components of the positive electrode are generally: 50–90% by weight active material; 5–30% carbon black as the electric conductive diluent; and 3–20% binder chosen to hold all particulate materials in contact with one another without degrading ionic conductivity. Stated ranges are not critical, and the amount of active material in an electrode may range from 25–85 weight percent. The negative electrode comprises about 50–95% by weight of a preferred graphite, with the balance constituted by the binder. A typical electrolyte separator film comprises approximately two parts polymer for every one part of a preferred fumed silica. Before removal of the plasticizer, the separator film comprises about 20–70% by weight of the composition; the balance constituted by the polymer and fumed silica in the aforesaid relative weight proportion. The conductive solvent comprises any number of suitable solvents and salts. Desirable solvents and salts are described in U.S. Pat. Nos. 5,643,695 and 5,418,091. One example is a mixture of $EC:PC:LiPF_6$ in a weight ratio of about 50:44.3:5.7. Another is EC:DMC with one molar $LiPF_6$.

Advantageously, a variety of solvents may be used with the salt of the invention. The range of salt content is relatively broad. Solvents are selected from such mixtures as dimethyl carbonate (DMC), diethylcarbonate (DEC), dipropylcarbonate (DPC), ethylmethylcarbanate (EMC), ethylene carbonate (EC), propylene carbonate (PC), butylene carbonate, lactones, esters (e.g. ethyl propionate; EP), glymes, sulfoxides, sulfolanes, etc. The preferred solvents are EC/DMC, EC/EMC, EC/DMC/EP and EC/PC/DMC/EP. The salt content ranges from 5% to 65% by weight, preferably from 15% to 35% by weight.

Those skilled in the art will understand that any number of methods are used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

Separator membrane element 16 is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

In the construction of a lithium-ion battery, a current collector layer of aluminum foil or grid is overlaid with a positive electrode film, or membrane, separately prepared as a coated layer of a dispersion of intercalation electrode composition. This is typically an intercalation compound such as LiMn$_2$O$_4$ (LMO), LiCoO$_2$, or LiNiO$_2$, powder in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Examples of forming cells containing metallic lithium anode, intercalation electrodes, solid electrolytes and liquid electrolytes can be found in U.S. Pat. Nos. 4,830,939; 4,935,317; 4,990,413; 4,792,504; 5,037,712; 5,463,179; 5,399,447; 5,482,795 and 5,411,820; each of which is incorporated herein by reference in its entirety. Note that the older generation of cells contained organic polymeric and inorganic electrolyte matrix materials, with the polymeric being most preferred. The polyethylene oxide of U.S. Pat. No. 5,411,820 is an example. More modern examples are the VDF:HFP polymeric matrix. Examples of casting, lamination and formation of cells using VdF:HFP are as described in U.S. Pat. Nos. 5,418,091; 5,460,904; and 5,456,000, assigned to Bell Communications Research, each of which is incorporated herein by reference in its entirety.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

We claim:

1. An electrolyte characterized by ion transport capability and comprising a salt represented by the formula:

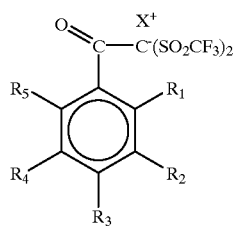

FORMULA A where $R_1$, $R_2$, $R_3$, $R_4$, and $R_5$ are each identical or different; are each independently selected from hydrogen and an electron withdrawing substituent; provided at least one of said $R_1$, $R_2$, $R_3$, $R_4$, and $R_5$ is selected from said electron withdrawing substituent; and where X is an alkali metal selected from the group consisting of lithium, sodium and potassium.

2. The electrolyte of claim 1 wherein said alkali metal is lithium.

3. The electrolyte of claim 1 wherein any two of said $R_2$, $R_3$ and $R_4$ are electron withdrawing substituents and $R_1$ and $R_5$ are each hydrogen.

4. The electrolyte of claim 3 wherein said two electron withdrawing substituents are the same.

5. The electrolyte of claim 3 wherein said two electron withdrawing substituents are different.

6. The electrolyte of claim 3 wherein said two electron withdrawing substituents are $R_2$ and $R_4$.

7. The electrolyte of claim 1 wherein said electron withdrawing substituent is $R_2$.

8. The electrolyte of claim 1 wherein said electron withdrawing substituent is selected from the group consisting of: —N$^+$(CH$_3$)$_4$, —N$^+$R$_4$, —NO$_2$, —CF$_3$, —SO$_3$H, —CN, —COCl, —COOR, —COOH, —COR, —CHO—, —CHY$_2$, —CH$_2$Y, —Y; where Y designates one or more are halogen atoms selected from the group consisting of F, Cl, Br and I and where R designates hydrogen.

9. A battery which comprises a first electrode, a counter-electrode, which forms an electrochemical couple with said first electrode, and an electrolyte for ion transport between said electrodes, said electrolyte comprising:

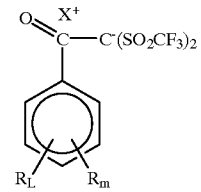

FORMULA B where $R_L$ and $R_m$ are each identical or different, $R_L$ is an electron withdrawing substituent, $R_m$ is hydrogen or an electron withdrawing substituent, and X is an alkali metal.

10. The battery according to claim 9 where said electron withdrawing substituent is selected from the group consisting of: —N$^+$(CH$_3$)$_4$, —N$^+$R$_4$, —NO$_2$, —CF$_3$, —SO$_3$H, —CN, —COCl, —COOR, —COOH, —COR, —CHO—, —CHY$_2$, —CH$_2$Y, —Y; where Y designates one or more are halogen atoms selected from the group consisting of F, Cl, Br and I and where R designates hydrogen.

11. The battery according to claim 9 wherein both of said $R_L$ and $R_m$ are electron withdrawing substituents.

12. A compound represented by the following formula:

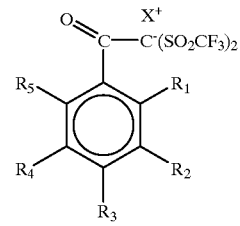

FORMULA A where $R_1$, $R_2$, $R_3$, $R_4$ and $R_5$ are each identical or different; are each independently selected from hydrogen and an electron withdrawing substituent; provided at least one of said $R_1$, $R_2$, $R_3$, $R_4$ and $R_5$ is selected from said electron withdrawing substituent; and where X is an alkali metal.

13. The compound of claim 12 wherein any two of said $R_2$, $R_3$ and $R_4$ are electron withdrawing substituents and $R_1$ and $R_5$ are each hydrogen.

14. The compound of claim 12 wherein said two electron withdrawing substituents are the same.

15. The compound of claim 12 wherein said two electron withdrawing substituents are different.

16. The compound of claim 12 wherein said two electron withdrawing substituents are $R_2$ and $R_4$.

17. The compound of claim 12 wherein said electron withdrawing substituent is $R_2$.

18. The compound of claim 12 wherein said electron withdrawing substituent is selected from the group consisting of: $-N^+(CH_3)_4$, $-N^+R_4$, $-NO_2$, $-CF_3$, $-SO_3H$, $-CN$, $-COCl$, $-COOR$, $-COOH$, $-COR$, $-CHO-$, $-CHY_2$, $-CH_2Y$, $-Y$; where Y designates one or more are halogen atoms selected from the group consisting of F, Cl, Br and I and where R designates hydrogen.

* * * * *